UNITED STATES PATENT OFFICE.

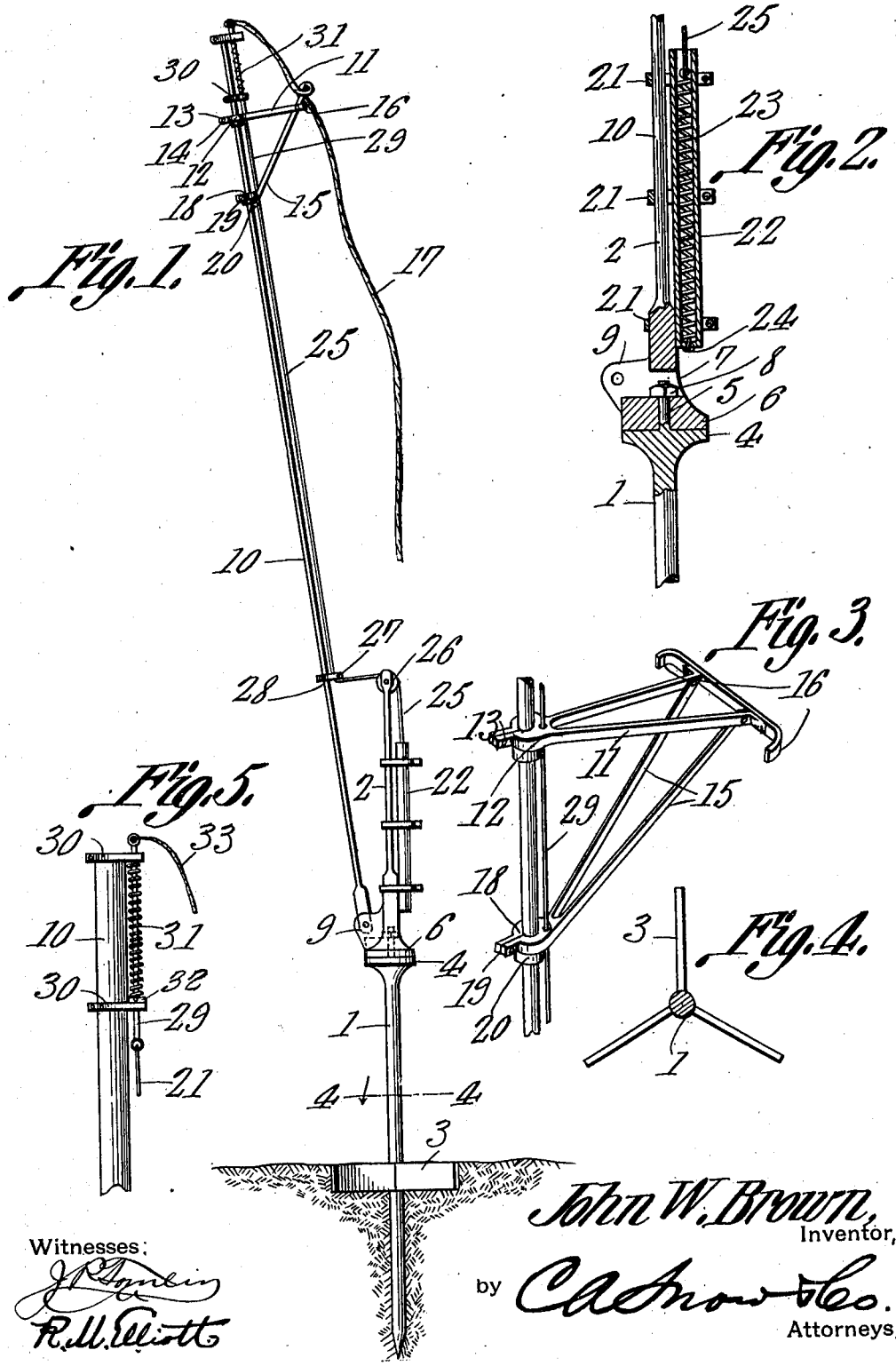

JOHN W. BROWN, OF HIGH POINT, NORTH CAROLINA.

TETHER.

982,469.  Specification of Letters Patent.  Patented Jan. 24, 1911.

Application filed October 5, 1910. Serial No. 585,489.

*To all whom it may concern:*

Be it known that I, JOHN W. BROWN, a citizen of the United States, residing at High Point, in the county of Guilford and State of North Carolina, have invented a new and useful Tether, of which the following is a specification.

This invention relates to animal tethers.

The object of the invention is in a novel manner to maintain a sufficient tension on the tethering line to prevent the latter from becoming entangled with the neck or legs of an animal, and yet without inconvenience to enable the animal to utilize the full range of the line.

A further object is to improve the manner of constructing and assembling the part of the standard and sweep arm, whereby the greatest efficiency in use will be secured with the minimum danger of derangement.

With the above and other objects in view, as will appear as the nature of the invention is better understood, the same consists in the novel construction and combination of parts of an animal tether, as will be hereinafter fully described and claimed.

In the accompanying drawing forming a part of this specification, and in which like characters of reference indicate corresponding parts: Figure 1 is a view in side elevation of a tether constructed in accordance with the present invention. Fig. 2 is an enlarged detail view in section of a portion of the standard. Fig. 3 is a perspective detail view of the tethering line hitch. Fig. 4 is a horizontal sectional view, taken on the line 4—4 Fig. 1, and looking in the direction of the arrow thereon. Fig. 5 is a detail view on an enlarged scale of the upper portion of the sweep lever and parts applied thereto.

The standard is composed of two sections 1 and 2, the section 1 being provided near its lower end with a winged anchor 3 that may be sunk any desired distance into the ground to maintain the standard in vertical position, and prevent its being dragged from place by strains applied to the tethering line by the animal. As is usual with devices of this character, the upper section of the standard is mounted for revoluble movements relative to the lower section, and to secure this result in a simple manner, the upper section is provided with a head 4 from the center of which projects a stud 5 that is engaged by a head 6 on the lower end of the upper section, the latter being provided with a transverse orifice to permit threading on the upper end of the stud a nut 8.

The upper section is provided with a pair of laterally extending ears 9 between which is pivotally mounted the lower end of the sweep lever 10 which may be constructed of any suitable material, preferably of a length of gas pipe.

Mounted upon the lever adjacent to its upper end is a line hitch, which comprises a pair of divergent arms 11 which merge into a split collar 12 provided with orificed extensions 13 arranged to receive a bolt 14 by which the collar is loosely combined with the lever. The upper ends of the arms 11 are outturned and have secured to them a cleat provided with curved terminals 16, the object of these cleats being to enable the operator to hold the tethering line 17 at the desired length.

In order to sustain the arms 11 in proper position, and to prevent the collar 12 from binding upon the lever, a pair of bars 15 is provided, the upper ends of which are riveted to the bars 11 adjacent to the cleat, and the lower ends of which merge into a split collar 18 that encircles the lever 10 and is held assembled therewith by a bolt 19. In order to prevent the hitch from slipping down upon the lever when the latter is in vertical position, a collar 20 is employed upon which the collar 20 bears.

Securely clamped to the section 2 of the standard by bands 21 is a casing 22 in which is arranged a coiled spring 23 the lower coil of which is secured to the bottom of the casing by a bolt 24. The upper end of the spring has secured to it a wire 25 to pass around a roller or grooved sheave 26 carried by the upper end of the section 2, thence around a roller 27 carried by a collar 28 secured to the sweep lever, and thence extends upward and is secured at its upper end to a rod 29 that is mounted to slide in collars 30 secured to the upper portion of the sweep lever. Arranged upon the rod is a coiled spring 31 the upper end of which bears against the terminal collar 30, and the lower coil of which bears against a collar 32 fixed to the rod. The rod projects upward beyond the terminal collar and is provided with an eye to which is secured the tethering line 33.

In operation, a tethering line of any desired length is secured to the upper end of the rod 29, and to the animal, as the latter grazes, the sweep lever will move through the arc of a circle, or through a complete circle, and thus allow the animal to graze over the entire area within the range of the tether, the spring 23 maintaining the tethering line under tension that will be sufficient to prevent it from becoming entangled with the neck or legs of the animal. As soon as the animal is released from the tethering line, the springs 23 and 31 will exert a draft on the wire 25, which will cause the sweep lever to assume the position shown in Fig. 1. When the tether is not in use, the line may be coiled about the two cleat members 16 and thus be held free of the ground.

The improvements herein described are simple in character, but will combine in the presentation of a thoroughly effective form of tether.

What is claimed is:

A tether comprising a two part standard, the lower section of which is provided with anchoring means, the two sections being revolubly connected, a sweep lever pivotally connected with the upper section, a casing fixed to the latter section and having a coiled spring secured at one end therein, a wire having one end connected with the spring and thence passing approximately to the upper end of the sweep, a tethering line, and a spring pressed rod connecting the tethering line and the wire.

In testimony that I claim the foregoing as my own, I have hereto affixed my signature in the presence of two witnesses.

JOHN W. BROWN.

Witnesses:
JAMES M. OVERBY,
L. M. LEE.